(12) United States Patent
Mei et al.

(10) Patent No.: US 10,471,407 B2
(45) Date of Patent: Nov. 12, 2019

(54) PROCESS FOR START-UP OF A MULTIZONE CIRCULATING REACTOR

(71) Applicant: Basell Polyolefine GmbH, Wesseling (DE)

(72) Inventors: Gabriele Mei, Ferrara (IT); Massimo Covezzi, Ferrara (IT); Gerhardus Meier, Frankfurt am Main (DE); Antonio Mazzucco, Ferrara (IT); Pietro Baita, Ferrara (IT); Ulf Schueller, Weiterstadt (DE); Lorella Marturano, Ferrara (IT); Enrico Balestra, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 111 days.

(21) Appl. No.: 15/853,072

(22) Filed: Dec. 22, 2017

(65) Prior Publication Data
US 2018/0178180 A1 Jun. 28, 2018

(30) Foreign Application Priority Data
Dec. 22, 2016 (EP) .................................. 16206297

(51) Int. Cl.
*B01J 8/28* (2006.01)
*B01J 8/18* (2006.01)
(Continued)

(52) U.S. Cl.
CPC ............... *B01J 8/28* (2013.01); *B01J 8/1809* (2013.01); *B01J 8/1818* (2013.01);
(Continued)

(58) Field of Classification Search
CPC ........ C08F 110/02; C08F 110/06; C08F 2/01; C08F 2/34; B01J 8/28; B01J 8/1809;
(Continued)

(56) References Cited

U.S. PATENT DOCUMENTS

| 5,698,642 A | 12/1997 | Govoni et al. |
| 6,455,642 B1 * | 9/2002 | Myhre ................... C08F 10/00 525/240 |

(Continued)

FOREIGN PATENT DOCUMENTS

| EP | 0728769 A1 | 8/1996 | |
| EP | 1012195 A * | 2/2003 | ............. C08F 10/00 |

(Continued)

OTHER PUBLICATIONS

The Extended European Search Report for EP16206297.0 dated Apr. 24, 2017.

(Continued)

*Primary Examiner* — Michael Bernshteyn

(57) ABSTRACT

A process for starting a multizone circulating reactor containing no polyolefin particles, comprising the steps of conveying gas through the reactor and the gas recycle line, feeding a particulate material comprising a polymerization catalyst and optionally polyolefin into the reactor, controlling the gas flow in a vertical reactor zone equipped with a throttling valve at the bottom so that the upwards gas velocity in the bottom part of this reaction zone is lower than the terminal free-fall velocity of the particulate material fed into the reactor, and, after the weight of the particulate polyolefin in this reactor zone is higher than the drag force of the upward moving gas, controlling the circulation rate of the polymer particles within the multizone circulating reactor by adjusting the opening of the throttling valve and adjusting the flow rate of a dosing gas.

15 Claims, 2 Drawing Sheets

(51) Int. Cl.
*C08F 110/02* (2006.01)
*C08F 110/06* (2006.01)

(52) U.S. Cl.
CPC .......... *C08F 110/02* (2013.01); *C08F 110/06* (2013.01); *B01J 2208/00548* (2013.01); *B01J 2208/00716* (2013.01)

(58) Field of Classification Search
CPC ............ B01J 8/1818; B01J 2208/00548; B01J 2208/00716
USPC .......................................................... 526/65
See application file for complete search history.

(56) References Cited

U.S. PATENT DOCUMENTS

| | | |
|---|---|---|
| 6,689,845 B1 | 2/2004 | Govoni et al. |
| 6,809,154 B2 * | 10/2004 | Lindahl .................. C08L 23/06 525/191 |
| 7,332,549 B2 | 2/2008 | Selo |
| 7,514,508 B2 | 4/2009 | Meier et al. |
| 8,796,402 B2 | 8/2014 | Gondorf et al. |
| 2016/0137759 A1 | 5/2016 | Brita et al. |

FOREIGN PATENT DOCUMENTS

| | | | |
|---|---|---|---|
| EP | 1012195 B1 * | 2/2003 | ............ B01J 8/1863 |
| EP | 2172492 A1 | 4/2010 | |
| WO | 9704015 A1 | 2/1997 | |
| WO | 0002929 A1 | 1/2000 | |
| WO | 2005007711 A1 | 1/2005 | |
| WO | 2005019280 A1 | 3/2005 | |
| WO | 2014202420 A1 | 12/2014 | |

OTHER PUBLICATIONS

The International Search Report and Written Opinion for PCT/EP2017/084010 dated Mar. 14, 2018.

D. Geldart, Gas Fluidization Technology, p. 155 et seq., J. Wiley & Sons Ltd., 1986.

* cited by examiner

US 10,471,407 B2

PROCESS FOR START-UP OF A MULTIZONE CIRCULATING REACTOR

CROSS-REFERENCE TO RELATED APPLICATIONS

This application claims the benefit of priority to European Patent Application No. 16206297.0 filed on Dec. 22, 2016, which is incorporated herein by reference in its entirety.

FIELD OF THE INVENTION

The present disclosure provides processes for starting up a gas-phase olefin polymerization reaction. The present disclosure further provides processes for producing a particulate polyolefin by polymerizing one or more olefins in a multizone circulating reactor. The present disclosure still further provides processes for polymerizing one or more olefins in a multizone circulating reactor.

BACKGROUND OF THE INVENTION

Polymerizing olefins in multizone circulating reactors may allow for the production of olefin polymers with a high productivity per unit volume of the reactor and with a high flexibility in the composition of the resulting polymers. Such multizone reactors are, for example, described in WO 97/04015 A1 and WO 00/02929 A1. WO 2005/019280 A1 describes polymerization processes comprising a combination of at least two gas-phase reactors, where at least one of the gas-phase reactors is a multizone circulating reactor. Multizone circulating reactors are gas-phase polymerization reactors in which the growing polymer particles flow upward through a first polymerization zone (riser), leave the riser and enter a second polymerization zone (downcomer) through which the growing polymer particles flow downward in a densified form. The densified polymer particles then leave the down-comer and are reintroduced into the riser. In this manner, a circulation of polymer between the riser and the downcomer is established. The gas employed for transporting the polymer particles in the riser may be separated from the polymer particles in the upper part of the multizone circulating reactor; recycled through a recycle gas line equipped with a compressor and a cooling unit for removing the heat of polymerization; and then re-used as transporting gas in the riser.

The industrial production of polyolefins may be carried out in continuous operation. That means, the input materials such as monomers, catalysts and polymerization additives are continuously introduced into the polymerization reactor and the obtained polyolefins are continuously withdrawn from the polymerization reactor. When it is desired to produce different polymer grades, the polymerization may be transitioned from one grade to another. In alternative embodiments, the transition may be done with minor (or no) interruption to polymerization. In order to be able to carry out certain maintenance or cleaning operations, it may nonetheless sometimes be needed to stop the polymerization reaction.

For re-starting (otherwise called "start up") the polymerization in gas-phase polymerization reactors such as fluidized-bed reactors, a pre-prepared "seed bed" or "charge powder" of polyolefin particles may be first introduced into the reactor. Polymerization may be initiated after such introduction in the presence of such a bed. Another option is to start up the gas-phase polymerization with an empty reactor, i.e. with a reactor that does not contain any polymer particles. This implies that no facilities for storing seed bed polymers need to be provided. However, when starting a gas-phase reactor with an empty reactor, care may be taken such that the small particle size catalyst particles are not entrained with the recycle gas into the recycle gas system. The system may also be monitored to ensure that the heat of polymerization is removed in order to avoid temperature raise with subsequent chunk formation.

SUMMARY OF THE INVENTION

The present disclosure provides a process for starting a gas-phase olefin polymerization reaction for producing a particulate polyolefin by polymerizing one or more olefins in a multizone circulating reactor,
wherein the multizone circulating reactor comprises
  a vertical first reactor zone and
  a vertical second reactor zone, which is equipped with a throttling valve at the bottom, a line for discharging polymer, and, in the upper part, means which allow measuring the level of a settled bed of polyolefin particles into the second reactor zone, and
  the upper region of the first reactor zone is connected with the upper region of the second reactor zone by a first connecting part and
  the lower region of the second reactor zone is connected with the lower region of the first reactor zone by a second connecting part; and
wherein the multizone circulating reactor further comprises
  a gas recycle line, which is equipped with a compressor and a heat exchanger for removing the heat of polymerization and which connects the top of the first reactor zone, the top of the second reactor zone or the first connecting part with at least
  a riser gas introduction point for feeding a riser gas at the bottom of the first reactor zone,
  a dosing gas introduction point for feeding a dosing gas into the second reactor zone above the throttling valve; and
  optionally a transport gas introduction point for feeding a transport gas to the second connecting part at the end of the connecting part, which is connected with the lower region of the second reactor zone,
comprising the steps of
a) providing an multizone circulating reactor being filled with a reactor gas at a pressure from 0.1 to 20 MPa and a temperature from 20 to 200° C. and containing no polyolefin particles,
b) conveying the reactor gas from the top of the first reactor zone, the top of the second reactor zone or the first connecting part through the gas recycle line to the riser gas introduction point, to the dosing gas introduction point and optionally to the transport gas introduction point;
c) feeding a particulate material comprising a polymerization catalyst and optionally polyolefin into the multizone circulating reactor;
d) controlling the gas flow in the second reactor zone by adjusting the opening of the throttling valve and the flow rates of the gas fed to the riser gas introduction point, to the dosing gas introduction point, and optionally to the transport gas introduction point so that the upwards gas velocity in the bottom part of the second reaction zone is lower than the terminal free-fall velocity of the particulate material fed into the multizone circulating reactor;
e) optionally feeding one or more olefins to the multizone circulating reactor and reacting the one or more olefins in the presence of the polymerization catalyst to polyolefin;

f) feeding, with a closed polymer discharged line, one or more olefins or a particulate material comprising a polymerization catalyst and polyolefin or one or more olefins and a particulate material comprising a polymerization catalyst and polyolefin into the multizone circulating reactor until the weight of the particulate polyolefin in the second reactor zone is higher than the drag force of the upward moving gas and a settled bed of polyolefin particles forms;

g) thereafter, controlling the circulation rate of the polymer particles within the multizone circulating reactor by adjusting the opening of the throttling valve and adjusting the flow rate of the dosing gas, optionally discharging polyolefin and controlling the feeding rates of the one or more olefins and the particulate material comprising a polymerization catalyst and polyolefin into the multizone circulating reactor and the rate for the optional discharge of the produced polyolefin in a way that the combined amounts of introduced polyolefin and olefin(s) are higher than the amount of discharged polyolefin until the level of the settled bed of polyolefin particles reaches the upper part of the second reactor zone;

h) thereafter, controlling the circulation rate of the polymer particles within the multizone circulating reactor by adjusting the opening of the throttling valve and adjusting the flow rate of the dosing gas, discharging polyolefin and controlling the feeding rates of the one or more olefins and the particulate material comprising a polymerization catalyst and polyolefin into the multizone circulating reactor and the discharge rate of the produced polyolefin in a way that the combined amounts of introduced polyolefin and olefin(s) are balanced with the amount of discharged polyolefin.

In some embodiments, the first reactor zone is a riser, in which growing polymer particles flow upwards under fast fluidization or transport conditions.

In some embodiments, in step d) the upwards gas velocity in the first reactor zone is higher than the terminal free-fall velocity of the particulate material fed into the multizone circulating reactor In some embodiments, the first reactor zone is a reactor zone, in which the polymerization occurs in a fluidized bed of growing polymer particles.

In some embodiments, in step f), a liquid hydrocarbon which vaporizes under the conditions within the second reactor zone is fed into the second reactor zone.

In some embodiments, the particulate material comprising the polymerization catalyst and optionally polyolefin is fed into the lower part of the first reactor zone or into the second connecting part.

In some embodiments, the throttling valve is a butterfly valve.

In some embodiments, the reactor gas comprises one or more alkanes having from 1 to 10 carbon atoms and the amount of alkanes having from 1 to 10 carbon atoms in the reactor gas is from 30 to 99 vol. %.

In some embodiments, the particulate material is a pre-polymerized polymerization catalyst.

In some embodiments, the multizone circulating reactor is part of a reactor cascade.

In some embodiments, the particulate material comprising the polymerization catalyst is a polyolefin produced in a polymerization reactor arranged upstream of the multizone circulating reactor.

In some embodiments, the polymerization reactor arranged upstream of the multizone circulating reactor is a fluidized bed reactor.

In some embodiments, the polyolefin is an ethylene polymer prepared by homopolymerizing ethylene or copolymerizing ethylene with one or more comonomers.

In some embodiments, the polyolefin is a propylene polymer prepared by homopolymerizing propylene or copolymerizing propylene with one or more comonomers.

In some embodiments, the present disclosure provides a process for producing a polyolefin by polymerizing one or more olefins in a multizone circulating reactor, wherein the polymerization reaction has been started by a process as described above.

In some embodiments, the present disclosure provides a process for starting up a polyethylene gas-phase reactor for producing polyethylene,
wherein the polyethylene gas-phase reactor has a multizone circulating reactor that comprises:
  a first reactor zone having an upper portion first reactor zone and a bottom portion first reactor zone and
  a second reactor zone having an upper portion second reactor zone and a bottom portion second reactor zone,
    the bottom portion second reactor zone has a throttling valve and polymer discharge line and,
    the upper portion second reactor zone has a device that measures the level of a settled bed of polyolefin particles into the second reactor zone, and
  the upper portion first reactor zone is in fluid communication with the upper portion second reactor zone by an upper connecting line and
  the bottom portion first reactor zone is in fluid communication with the bottom portion second reactor zone by a lower connecting line; and
wherein the multizone circulating reactor further comprises
  a gas recycle line, having a compressor and a heat exchanger
  a riser gas introduction point for feeding a riser gas at the bottom portion of the first vertical reactor zone,
  a dosing gas introduction point for feeding a dosing gas into the second reactor zone above the throttling valve,
comprising the steps of
a) providing a reactor gas at a pressure from 0.1 to 20 MPa and a temperature from 20 to 200° C. and containing no polyolefin particles to the multizone circulating reactor,
b) conveying the reactor gas from any of:
  the upper portion first reactor zone,
  the upper portion second reactor zone or
  the upper connecting line
  through the gas recycle line to the riser gas introduction point, to the dosing gas introduction point;
c) feeding a particulate material comprising a polymerization catalyst and optionally polyolefin into the multizone circulating reactor;
d) controlling the gas flow in the second reactor zone by adjusting an opening of the throttling valve and the flow rates of the gas fed to the riser gas introduction point, to the dosing gas introduction point, and optionally to the transport gas introduction point so that the upwards gas velocity in the bottom portion second reaction zone is lower than a terminal free-fall velocity of the particulate material fed into the multizone circulating reactor;
e) optionally feeding one or more olefins to the multizone circulating reactor and reacting the one or more olefins in the presence of the polymerization catalyst to polyolefin;

f) feeding, with a closed polymer discharged line, one or more olefins or a particulate material comprising a polymerization catalyst and polyolefin or one or more olefins and a particulate material comprising a polymerization catalyst and polyolefin into the multizone circulating reactor until the particulate polyolefin has a weight in the second reactor zone that is higher than a drag force of the upward moving gas and a settled bed of polyolefin particles;

g) thereafter, controlling the circulation rate of the polymer particles within the multizone circulating reactor by adjusting the opening of the throttling valve and adjusting the flow rate of the dosing gas, optionally discharging polyolefin and controlling the feeding rates of the one or more olefins and the particulate material comprising a polymerization catalyst and polyolefin into the multizone circulating reactor and the rate for the optional discharge of the produced polyolefin in a way that the combined amounts of introduced polyolefin and olefin(s) are higher than the amount of discharged polyolefin until the level of the settled bed of polyolefin particles reaches the upper part of the second reactor zone;

h) thereafter, controlling the circulation rate of the polymer particles within the multizone circulating reactor by adjusting the opening of the throttling valve and adjusting the flow rate of the dosing gas, discharging polyolefin and controlling the feeding rates of the one or more olefins and the particulate material comprising a polymerization catalyst and polyolefin into the multizone circulating reactor and the discharge rate of the produced polyolefin in a way that the combined amounts of introduced polyolefin and olefin(s) are balanced with the amount of discharged polyolefin.

DETAILED DESCRIPTION OF THE INVENTION

Figure 1:
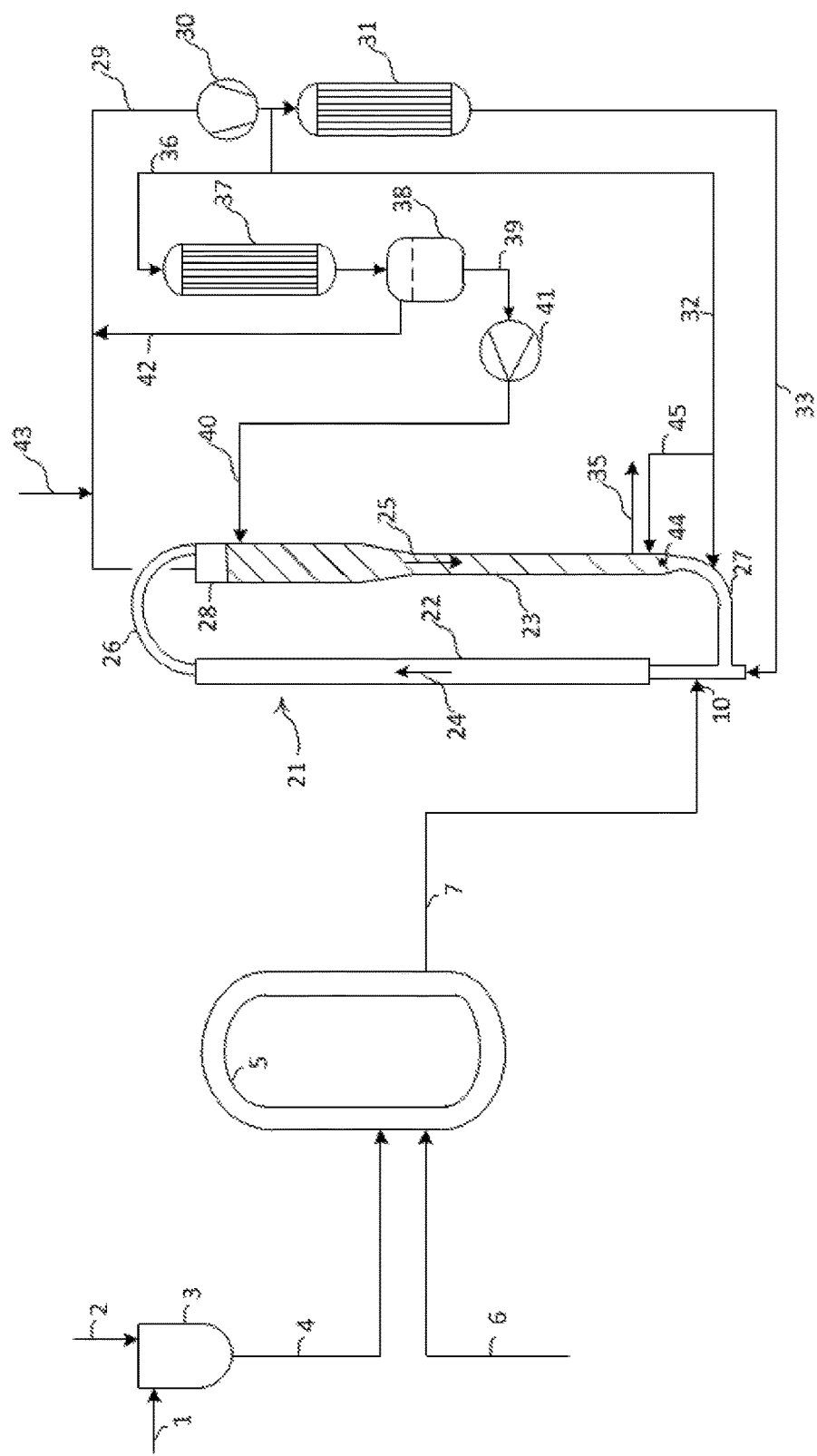
FIG. 1 shows schematically a multizone circulating reactor for carrying out the process of the present disclosure.

The present disclosure provides a process for starting a gas-phase olefin polymerization reaction for producing a particulate polyolefin by polymerizing one or more olefins. Olefins which may be employed in the process of the present disclosure may be 1-olefins, i.e. hydrocarbons having terminal double bonds, without being restricted thereto. The olefins can be functionalized olefinically unsaturated compounds such as ester or amide derivatives of acrylic or methacrylic acid, for example acrylates, methacrylates, or acrylonitrile or the olefins can be nonpolar olefinic compounds, including aryl-substituted 1-olefins. In an embodiment, the 1-olefins are linear or branched $C_2$-$C_{12}$-1-alkenes, or linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various 1-olefins. The olefins also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is also possible to polymerize mixtures of two or more olefins.

The process may be carried out in a homopolymerization or copolymerization of ethylene or propylene or in a homopolymerization or copolymerization of ethylene. The comonomers in propylene polymerization may be up to 40 wt. % of ethylene, 1-butene and/or 1-hexene, or from 0.5 wt. % to 35 wt. % of ethylene, 1-butene and/or 1-hexene. Comonomers in ethylene polymerization may be up to 20 wt. %, or from 0.01 wt. % to 15 wt. % or from 0.05 wt. % to 12 wt. % of $C_3$-$C_8$-1-alkenes, such as 1-butene, 1-pentene, 1-hexene and/or 1-octene. In an embodiment, ethylene is copolymerized with from 0.1 wt. % to 12 wt. % of 1-hexene and/or 1-butene.

In an embodiment of the present disclosure, the polymerization is carried out in the presence of an inert gas such as nitrogen or an alkane having from 1 to 10 carbon atoms such as methane, ethane, propane, n-butane, isobutane, n-pentane, isopentane or n-hexane or mixtures thereof. In an embodiment, nitrogen or propane are used as inert gas, if appropriate in combination with further alkanes. In other embodiments of the present disclosure, the polymerization is carried out in the presence of a $C_3$-$C_5$ alkane as polymerization diluent or in the presence of propane, for example in the case of homopolymerization or copolymerization of ethylene. The reaction gas mixtures within the reactor additionally comprise the olefins to be polymerized, i.e. a main monomer and one or more optional comonomers. In an embodiment of the present disclosure, the reaction gas mixture has a content of inert components from 30 to 99 vol. %, or from 50 to 95 vol. %, or from 60 to 90 vol. %. In another embodiment of the present disclosure, for example if the main monomer is propylene, no or only minor amounts of inert diluent are added. The reaction gas mixture may further comprise additional components such as molecular weight regulators like hydrogen or polymerization inhibitors like carbon monoxide or water. The components of the reaction gas mixture may be fed into the gas-phase polymerization reactor in gaseous form or as liquid which vaporizes within the reactor.

The polymerization of olefins can be carried out using all customary olefin polymerization catalysts. That means the polymerization can be carried out using Phillips catalysts based on chromium oxide, using Ziegler- or Ziegler-Natta-catalysts, or using single-site catalysts. For the purposes of the present disclosure, single-site catalysts are catalysts based on chemically uniform transition metal coordination compounds. Furthermore, it is also possible to use mixtures of two or more of these catalysts for the polymerization of olefins. Such mixed catalysts may be designated as hybrid catalysts. The preparation and use of these catalysts for olefin polymerization are generally known.

In an embodiment, the catalysts are of the Ziegler type, for example comprising a compound of titanium or vanadium, a compound of magnesium and optionally an electron donor compound and/or a particulate inorganic oxide as a support material.

Titanium compounds of the present disclosure may be made of the halides or alkoxides of trivalent or tetravalent titanium, with titanium alkoxy halogen compounds or mixtures of various titanium compounds also being possible. Examples of titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)Cl_3$, $Ti(OC_2H_5)Br_3$, $Ti(O\text{-}n\text{-}C_4H_9)Br_3$, $Ti(OCH_3)_2C_{12}$, $Ti(OC_2H_5)_2C_{12}$, $Ti(O\text{-}n\text{-}C_4H_9)_2C_{12}$, $Ti(OC_2H_5)_2Br_2$, Ti(OCH$_3$)$_3$Cl, Ti(OC$_2$H$_5$)$_3$C$_1$, Ti(O-n-C$_4$H$_9$)$_3$C$_1$, Ti(OC$_2$H$_5$)$_3$ Br, Ti(OCH$_3$)$_4$, Ti(OC$_2$H$_5$)$_4$ or Ti(O-n-C$_4$H$_9$)$_4$. In an embodiment, titanium compounds which comprise chlorine as the halogen are used or titanium halides which comprise only halogen in addition to titanium or titanium chlorides or titanium tetrachloride. Among the vanadium compounds, particular mention may be made of the vanadium halides, the vanadium oxyhalides, the vanadium alkoxides and the vanadium acetylacetonates. In an embodiment, the vanadium compounds are in the oxidation states 3 to 5.

In the production of the solid component, at least one compound of magnesium may be additionally used. Compounds of this type may be halogen-comprising magnesium compounds such as magnesium halides or the chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, or chlorine or bromine, or chlorine.

Possible halogen-comprising magnesium compounds are in particular magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. Halogenating agents may be, for example, halogens, hydrogen halides, SiCl$_4$ or CCl$_4$ or chlorine or hydrogen chloride.

Examples of halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyl-oxymagnesium, n-butyloxyoctyloxymagnesium and diphenoxymagnesium. In an embodiment, n-butylethylmagnesium or n-butyloctylmagnesium are used.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids apart from magnesium dichloride or magnesium dibromide, the di(C$_1$-C$_{10}$-alkyl)magnesium compounds may be used. The Ziegler- or Ziegler-Natta-catalyst may comprise a transition metal selected from titanium, zirconium, vanadium, chromium.

Electron donor compounds for preparing Ziegler type catalysts may be for example alcohols, glycols, esters, ketones, amines, amides, nitriles, alkoxysilanes and aliphatic ethers. These electron donor compounds can be used alone or in mixtures with each other as well as with additional electron donor compounds.

The alcohols may be those of formula R$^1$OH in which the R$^1$ group is a C$_1$-C$_{20}$ hydrocarbon group or R$^1$ is a C$_1$-C$_{10}$ alkyl group. Specific examples are methanol, ethanol, isopropanol and n-butanol. The glycols may be those having a total number of carbon atoms lower than 50 or the glycols are the 1,2 or 1,3 glycols having a total number of carbon atoms lower than 25. Specific examples are ethylene glycol, 1,2-propylene glycol and 1,3-propylene glycol. The esters may be the alkyl esters of C$_1$-C$_{20}$ aliphatic carboxylic acids and in particular C$_1$-C$_8$ alkyl esters of aliphatic mono carboxylic acids such as ethyl acetate, methyl formate, ethyl formate, methyl acetate, propyl acetate, i-propyl acetate, n-butyl acetate, i-butyl acetate. The amines may be those of formula NR$^2_3$ in which the R$^2$ groups are, independently, hydrogen or a C$_1$-C$_{20}$ hydrocarbon group with the proviso that the R$^2$ groups are not simultaneously hydrogen, or R$^2$ is a C$_1$-C$_{10}$ alkyl group. Specific examples are diethylamine, diisopropylamine and triethylamine. The amides may be those of formula R$^3$CONR$^4_2$ in which R$^3$ and R$^4$ are, independently, hydrogen or a C$_1$-C$_{20}$ hydrocarbon group. Specific examples are formamide and acetamide. The nitriles may be those of formula R$^1$CN where R$^1$ has the same meaning given above. A specific example is acetonitrile. The alkoxysilanes may be those of formula R$^5_a$R$^6_b$Si(OR$^7$)$_c$, where a and b are integers from 0 to 2, c is an integer from 1 to 4 and the sum (a+b+c) is 4; and R$^5$, R$^6$, and R$^7$, are alkyl, cycloalkyl or aryl radicals with 1-18 carbon atoms optionally containing heteroatoms. In an embodiment of the silicon compounds, a is 0 or 1, c is 2 or 3, R$^6$ is an alkyl or cycloalkyl group, optionally containing heteroatoms, and R$^7$ is methyl. Examples of such silicon compounds are methyltrimethoxysilane, dimethyldimethoxysilane, trimethylmethoxysilane and t-butyltrimethoxysilane.

The electron donor compounds may be selected from the group consisting of amides, esters, and alkoxysilanes.

Catalysts of the Ziegler type may be polymerized in the presence of a cocatalyst. The cocatalysts may be organometallic compounds of metals of Groups 1, 2, 12, 13 or 14 of the Periodic Table of Elements, or organometallic compounds of metals of Group 13 or organoaluminum compounds. Such cocatalysts are for example organometallic alkyls, organometallic alkoxides, or organometallic halides.

The organometallic compounds may comprise lithium alkyls, magnesium or zinc alkyls, magnesium alkyl halides, aluminum alkyls, silicon alkyls, silicon alkoxides and silicon alkyl halides, or the organometallic compounds comprise aluminum alkyls and magnesium alkyls, or the organometallic compounds comprise aluminum alkyls, or trialkylaluminum compounds. In an embodiment, the aluminum alkyls comprise, for example, trimethylaluminum, triethylaluminum, tri-isobutylaluminum, tri-n-hexylaluminum, diethylaluminium chloride or mixture thereof, or triethylaluminum, tri-isobutylaluminum, diethylaluminium chloride or mixture thereof.

The present disclosure provides a process for starting a gas-phase olefin polymerization reaction in a multizone circulating reactor in which the polymerization is carried out in a first polymerization zone, in which growing polymer particles flow upwards under fluidization, fast fluidization or transport conditions, and in a second polymerization zone, in which growing polymer particles flow downward in a densified form. The polymer particles leaving the first polymerization zone are transferred into the second polymerization zone and the polymer particles leaving the second polymerization zone are reintroduced into the first polymerization zone, thus establishing a circulation of polymer particles between first and second polymerization zone. Accordingly, the multizone circulating reactor comprises a vertical first reactor zone and a vertical second reactor zone and the upper region of the first reactor zone is connected with the upper region of the second reactor zone by a first connecting part and the lower region of the second reactor zone is connected with the lower region of the first reactor zone by a second connecting part.

In an embodiment of the present disclosure, the vertical first reactor zone is designed to comprise a fluidized bed of growing polymer particles. The first reactor zone then operates as thoroughly mixed gas-phase reactor such as a fluidized bed reactor. In such reactors, the polymerization takes place in a bed of polymer particles which is maintained in a fluidized state by feeding in a reaction gas mixture at the lower end of the reactor, for example below a gas distribution grid having the function of dispensing the gas flow, and taking off the gas again at its upper end. The reaction gas mixture is then returned to the lower end to the reactor via a recycle line equipped with a compressor and a heat exchanger for removing the heat of polymerization. The velocity of the reaction gas mixture has to be sufficiently high firstly to fluidize the mixed bed of finely divided polymer present in the tube serving as polymerization zone and secondly to remove the heat of polymerization effectively.

When the first reactor zone is designed to comprise a fluidized bed of growing polymer particles, the second reactor zone may be positioned within, around or adjacent to the first reactor zone. It is also possible to employ two or more separated units, in which the growing polymer particles flow downward in a densified form, as second reactor zone.

In an embodiment of the present disclosure, the vertical first reactor zone is a riser, in which an upward movement of growing polymer particles occurs under fast fluidization or transport conditions. Fast fluidization conditions inside the riser are established by feeding a reaction gas mixture at a velocity higher than the transport velocity of the polymer particles. The velocity of the reaction gas mixture may be comprised between 0.5 and 15 m/s, or between 0.8 and 5 m/s. The terms "transport velocity" and "fast fluidization conditions" are well known in the art. For a definition of those terms see, for example, "D. Geldart, Gas Fluidization Technology, page 155 et seq., J. Wiley & Sons Ltd., 1986". Also when operating the first reactor zone as riser, reaction gas is taken off at the upper end of the multizone circulating reactor, conveyed through a recycle line equipped with a compressor and a heat exchanger, and then re-used as riser gas.

The multizone circulating reactor of the present disclosure further comprises a vertical second reactor zone which is designed to operate as downcomer in which the growing polymer particles flow downward in a densified form. Such a reactor zone may also be designated as a "moving bed" or a "settled bed" reaction unit or reactor. Throughout the present disclosure, the term "densified form" of the polymer means that the ratio between the mass of polymer and the reactor volume is higher than 80% of the "poured bulk density" of the resulting polymer. Thus, for instance, in the case of a polymer bulk density equal to 420 kg/m$^3$, a "densified form" of the polymer implies that the polymer mass/reactor volume ratio is at least 336 kg/m$^3$. The "poured bulk density" of a polymer is a parameter well known to the person skilled in the art: it can be measured according to DIN EN ISO 60:1999. The density of solid inside the reactor is defined as the mass of polymer per volume of reactor occupied by the polymer.

A downcomer may be a polymerization zone containing a bed of growing polymer particles, which moves downwards in a substantially plug flow mode. By "plug flow mode", it is meant that there is little or no backmixing of the polymer particles. In an embodiment of the process according to the present disclosure, the polymer particles flow downwards in the downcomer with a velocity of from 0.01 to 0.7 m/s, or from 0.1 to 0.6 m/s, or from 0.15 to 0.5 m/s.

For replacing reacted olefins and for controlling the gas flow within the downcomer, gaseous or liquid feed streams may be introduced at one or more positions into the downcomer. The feed streams may comprise the main monomer and may further comprise one or more comonomers, inert components such as propane, or hydrogen. Depending on the amounts of added gaseous or liquid feed streams to the downcomer and the pressure conditions within the downcomer, the gaseous medium surrounding the polymer particles can be designed to move downwards concurrently with the polymer particles or upward countercurrently to the polymer particles. When feeding liquid streams to the downcomer, these liquid streams may vaporize within the downcomer, contributing to the composition of the reaction gas mixture within the downcomer. When operating the downcomer with more than one feed stream, the feeding points for introducing the feed streams into the downcomer may be evenly distributed over the height of the downcomer.

The second reactor zone of the multizone circulating reactor of the present disclosure is equipped at the bottom with a throttling valve. This valve is employed for controlling the flow of the growing polymer particles from the second reactor zone into the first reactor zone. The throttling valve may be a mechanical valve, such as a simple or double butterfly valve or a ball valve, or this valve is a butterfly valve. A stream of a gas, sometimes denominated as "dosing gas", may be fed into the lower part of the second reactor zone at one or more positions shortly above the valve to facilitate the flow of the growing polymer particles through the valve. The dosing gas may be taken from a recycling stream of unreacted monomers downstream of the compressor. By varying the opening of the valve and/or varying the flow rate of the dosing gas, it is possible to adjust the velocity of the polymer particles within the second reactor zone.

The second reactor zone is further equipped with a line for discharging polymer, and, in the upper part, with means which allow measuring the level of a settled bed of polyolefin particles within the second reactor zone, such as gamma ray detectors.

The multizone circulating reactor comprises a gas recycle line for conveying the reaction gas mixture, which is taken off at the upper end of the multizone circulating reactor, back to the bottom of the multizone circulating reactor. The gas recycle line is equipped with a compressor and a heat exchanger for removing the heat of polymerization. The gas coming from the gas recycle line is employed as riser gas for transporting the growing polymer particles under fluidization, fast fluidization or transport conditions through the first reactor zone, as dosing gas for facilitating the flow of the growing polymer particles through the throttling valve and optionally as transport gas for conveying the growing polymer particles from the bottom of the second reactor zone through the second connecting part to the first reactor zone. Accordingly, the gas recycle line connects the top of the first reactor zone, the top of the second reactor zone or the first connecting part with at least a riser gas introduction point at the bottom of the first reactor zone, a dosing gas introduction point at the second reactor zone above the throttling valve, and optionally a transport gas introduction point at the end of the connecting part, which is connected with the lower region of the second reactor zone.

In an of the present disclosure, the multizone circulating reactor comprises a riser as first reactor zone. Such multizone circulating reactors are, for example, described in WO 97/04015 A1 and WO 00/02929 A1 and have two interconnected polymerization zones, a riser, in which the growing polymer particles flow upward under fast fluidization or transport conditions and a downcomer, in which the growing polymer particles flow in a densified form under the action of gravity. The polymer particles leaving the riser enter the downcomer and the polymer particles leaving the downcomer are reintroduced into the riser, thus establishing a circulation of polymer between the two polymerization zones and the polymer is passed alternately a plurality of times through these two zones. In such polymerization reactors, a solid/gas separator is arranged above the downcomer to separate the polyolefin and reaction gaseous mixture coming from the riser. The growing polyolefin particles enter the downcomer and the separated reaction gas mixture of the riser is continuously recycled through a gas recycle line to one or more points of reintroduction into the polymerization reactor. The major part of the recycle gas may be recycled to the bottom of the riser. In an embodiment, a line for the catalyst feed is arranged on the riser and a polymer discharge system is located in the bottom portion of the downcomer. The introduction of make-up monomers, comonomers, hydrogen and/or inert components may occur at various points along the riser and the downcomer.

Carrying out the polymerization in a polymerization reactor comprising a riser, which operates under fast fluidization or transport conditions, provides that the growing polymer particles pass repeatedly the polymerization zones of the polymerization reactor. It is so possible to produce within one gas-phase polymerization reactor homogeneous multimodal olefin polymers with improved polymer property combinations.

FIG. 1 shows schematically a multizone circulating reactor for carrying out the process of the present disclosure. The multizone circulating reactor is designed to be supplied with a pre-polymerized catalyst.

A solid catalyst component is fed via line (1) and cocatalyst, diluent, for example propane, and optionally one or more electron donor compounds are fed via line (2) to a pre-contacting vessel (3). The formed catalyst system is fed via line (4) to a loop pre-polymerization reactor (5). An olefin, for example propylene, is fed to the loop reactor (5) via line (6). A suspension containing the pre-polymerized catalyst particles is discharged from the loop reactor (5) and is fed via line (7) to a catalyst injection point (10) of a multizone circulating reactor (21).

Multizone circulating reactor (21) comprises as first reactor zone a riser (22) and as second reactor zone a downcomer (23) which are repeatedly passed by the growing polyolefin particles. Within riser (22), the polyolefin particles flow upward (against gravity) under fast fluidization conditions along the direction of arrow (24). Within the downcomer (23), the polyolefin particles flow downward (with gravity) under the action of gravity along the direction of the arrow (25). The riser (22) and the downcomer (23) are appropriately interconnected by the interconnection bends (26) and (27).

After flowing through the riser (22), the polyolefin particles and the reaction gas mixture leave riser (22) and are conveyed to a solid/gas separation zone (28). This solid/gas separation can be effected by using conventional separation means such as, for example, a centrifugal separator like a cyclone. From the separation zone (28), the polyolefin particles enter downcomer (23).

The reaction gas mixture leaving the separation zone (28) is recycled to the riser (22) by means of a recycle line (29), equipped with a compressor (30) and a heat exchanger (31). Between the compressor (30) and the heat exchanger (31), the recycle line (29) splits and the gaseous mixture is divided into two separated streams: line (32) conveys a part of the recycle gas into the interconnection bend (27), while line (33) conveys another part the recycle gas to the bottom of riser (22), so as to establish fast fluidization conditions therein.

The polyolefin particles obtained in multizone circulating reactor (21) are continuously discharged from the bottom part of downcomer (23) via the discharge line (35).

A part of the gaseous mixture leaving the separation zone (28) exits the recycle line (29) after having passed the compressor (30) and is sent through line (36) to the heat exchanger (37), where it is cooled to a temperature at which the monomers and the optional inert gas are partially condensed. A separating vessel (38) is placed downstream of the heat exchanger (37). The separated liquid is withdrawn from the separating vessel (38) via line (39) and fed to downcomer (23) through line (40) by means of a pump (41) to generate the barrier for preventing the reaction gas mixture of the riser (22) from entering the downcomer (23). The gaseous mixture obtained as gas-phase in the separating vessel (38) is recirculated to recycle line (29) through line (42). Make-up monomers, make-up comonomers, and optionally inert gases and/or process additives can be introduced into the recycle line (29) via line (43).

The bottom of the downcomer (23) is equipped with a butterfly valve (44) having an adjustable opening for adjusting the flow of polyolefin particles from downcomer (23) through interconnection bend (27) into the riser (22). Above the butterfly valve (44), amounts of a recycle gas mixture coming from the recycle line (29) through line (45) are introduced as dosing gas into the downcomer (23).

In an embodiment of the present disclosure, the multizone circulating reactor is part of a reactor cascade. The further polymerization reactors of the reactor cascade can be any kind of low-pressure polymerization reactors such as gas-phase reactors or suspension reactors. If the polymerization process of the reactor cascade includes a polymerization in suspension, the suspension polymerization may be carried out upstream of the gas-phase polymerization. Reactors for carrying out such a suspension polymerization may be for example loop reactors or stirred tank reactors. Suspension media may be inter alia inert hydrocarbons such as isobutane or mixtures of hydrocarbons or else the monomers themselves. If the multistage polymerization of olefins comprises additional polymerization stages carried out in gas-phase, the additional gas-phase polymerization reactors can be any type of gas-phase reactors like horizontally or vertically stirred gas-phase reactors, fluidized-bed reactors or multizone circulating reactors. Such additional gas-phase polymerization reactors may be arranged downstream or upstream of the gas-phase polymerization reactor. In an embodiment of the present disclosure, the multizone circulating reactor is part of a reactor cascade in which a fluidized-bed polymerization reactor is arranged upstream of the multizone circulating reactor.

Figure 2:
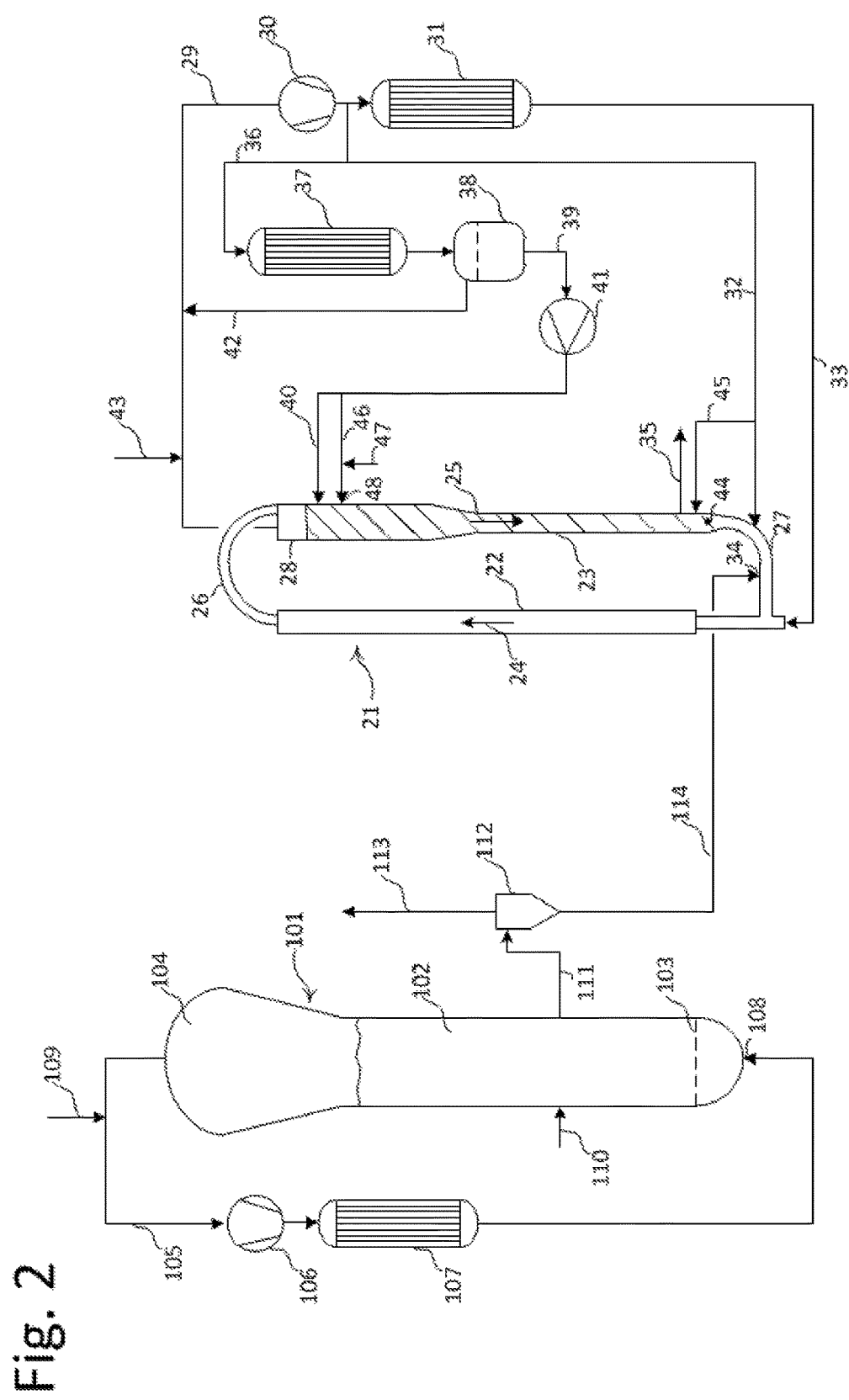
FIG. 2 shows schematically reactor cascade comprising a multizone circulating reactor for carrying out the process of the present disclosure.

FIG. 2 shows schematically a set-up of a polymerization reactor cascade comprising a fluidized-bed reactor and a multizone circulating reactor for carrying out the process of the present disclosure.

The first gas-phase reactor, fluidized-bed reactor (101), comprises a fluidized bed (102) of polyolefin particles, a gas distribution grid (103) and a velocity reduction zone (104).

The velocity reduction zone (104) may be of increased diameter compared to the diameter of the fluidized-bed portion of the reactor. The polyolefin bed is kept in a fluidization state by an upward flow of gas fed through the gas distribution grid (103) placed at the bottom portion of the reactor (101). The gaseous stream of the reaction gas mixture leaving the top of the velocity reduction zone (104) via recycle line (105) is compressed by compressor (106), transferred to a heat exchanger (107), in which it is cooled, and then recycled to the bottom of the fluidized-bed reactor (101) at a point below the gas distribution grid (103) at position (108). The recycle gas can, if appropriate, be cooled to below the dew point of one or more of the recycle gas components in the heat exchanger so as to operate the reactor with condensed material, i.e. in the condensing mode. The recycle gas can comprise, besides unreacted monomers, also inert condensable gases, such as alkanes, as well as inert non-condensable gases, such as nitrogen. Make-up monomers, hydrogen, and optional inert gases or process additives can be fed into the reactor (101) at various positions, for example via line (109) upstream of the compressor (106); this non-limiting the scope of the disclose. The catalyst may be fed into the reactor (101) via a line (110) that may be placed in the lower part of the fluidized bed (102).

The polyolefin particles obtained in fluidized-bed reactor (101) are discontinuously discharged via line (111) and fed to a solid/gas separator (112) in order to avoid that the gaseous mixture coming from the fluidized-bed reactor (101) enters the multizone circulating reactor. The gas leaving solid/gas separator (112) exits the reactor via line (113) as off-gas while the separated polyolefin particles are fed via line (114) to the multizone circulating reactor (21).

Multizone circulating reactor (21) shown in FIG. 2 is identical to multizone circulating reactor (21) shown in FIG. 1, except that not a pre-polymerized catalyst is fed into the multizone circulating reactor (21) but that polyolefin particles coming from the fluidized-bed reactor (101) via line (114) enter the multizone circulating reactor (21) at the interconnection bend (27) in position (34). Furthermore, liquid withdrawn from the separating vessel (38) is additionally fed to downcomer (23) through line (46). Make-up monomers, make-up comonomers, and optionally inert gases and/or process additives can be introduced via line (47) into line (46) and then fed into the downcomer (23) at monomer feeding point (48).

The process of the present disclosure is characterized in that the polymerization is started with an empty multizone circulating reactor; i.e. with a reactor which does not contain particulate polyolefin. As step a) of the starting process, the multizone circulating reactor is filled with a reactor gas and brought to a pressure from 0.1 to 20 MPa and a temperature from 20 to 200° C. Depending from the conditions before the start-up, the reactor may be rendered inert by purging with an inert gas or by introducing a scavenger such as an organoaluminum compound before carrying out step a). The reactor gas employed in step a) can have a composition identical or similar to the composition of the reaction gas in the multizone circulating reactor after the started polymerization has reached steady state. The composition of the reactor gas employed in step a) can however also differ in the composition and, for example, contain only inert components and no monomers.

After having reached a targeted pressure and temperature for the start-up, a circulation of reactor gas through the recycle gas line is commenced as step b). Driven by the compressor arranged in the recycle gas line, the reactor gas is conveying from the upper end of the multizone circulating reactor, i.e. from the top of the first reactor zone, the top of the second reactor zone or the first connecting part, through the gas recycle line to the riser gas introduction point, to the dosing gas introduction point and optionally to the transport gas introduction point. The gas feeding rates at the gas introduction points may be lower than those after the completed start-up in steady state of the polymerization. In a embodiment of the present disclosure, the amounts of gas fed at the dosing gas introduction point and the optional transport gas introduction point are in step b) not more than to avoid plugging when introducing particulate material in step c). Because, in step b), the multizone circulating reactor is still free from particulate material in the reactor, the reactor gas introduced in the lower part of the multizone circulating reactor at the riser gas introduction point, at the dosing gas introduction point and optionally at the transport gas introduction point can flow through both the first reactor zone and the second reactor zone to the upper end of the multizone circulating reactor.

After having established a circulation of reactor gas through the recycle gas line, particulate material comprising a polymerization catalyst and optionally polyolefin is fed as step c) into the multizone circulating reactor. The particulate material comprising a polymerization catalyst and optionally polyolefin may be a neat polymerization catalyst, a pre-polymerized polymerization catalyst or growing polyolefin particles produced in a polymerization reactor arranged upstream of the multizone circulating reactor.

In an embodiment of the present disclosure, the particulate material is a pre-polymerized polymerization catalyst. The pre-polymerization of the catalyst may be carried out in a diluent in one, two or more pre-polymerization vessel, optionally preceded by a catalyst pre-activation step. In an embodiment, the pre-polymerization is carried out in a loop reactor. The pre-polymerization may be conducted at temperatures from 0 to 80° C., or 20 to 50° C. at a pressure from 0.1 to 10 MPa. The residence time of the catalyst in the one, two or more pre-polymerization vessels may be from 2 minutes to 3 hours, or from 5 minutes to 1 hour. The degree of pre-polymerization may be from 0.2 to 800 g polymer/g of solid catalyst, or from 1 to 400 g polymer/g of solid catalyst. The pre-polymerization may be carried out with only one olefin as monomer, such as propylene or ethylene, or may be a copolymerization with a combination of two or more olefins. Furthermore, it is possible to conduct the pre-polymerization in presence of additives such as hydrogen or electron donor compounds.

In another embodiment of the present disclosure, the multizone circulating reactor is part of a reactor cascade and the particulate material comprising the polymerization catalyst is a polyolefin produced in a polymerization reactor arranged upstream of the multizone circulating reactor.

The particulate material comprising the polymerization catalyst and optionally polyolefin may be fed into the lower part of the first reactor zone or into the second connecting part.

The process of the present disclosure is characterized in that after having started the feed of the particulate material comprising the polymerization catalyst, as step d), the gas flow in the second reactor zone is controlled by adjusting the opening of the throttling valve and adjusting the flow rates of the gas fed to the riser gas introduction point, to the dosing gas introduction point, and optionally to the transport gas introduction point so that the upwards gas velocity in the bottom part of the second reaction zone is lower than the terminal free-fall velocity of the particulate material fed into the multizone circulating reactor. The terminal free-fall velocity of a particle is the velocity which a particle reaches when it falls through a stationary fluid. This velocity depends on the size and the shape of the particle. When a particle is situated in an upwards flowing gas and the velocity of this upwards flowing gas is higher than the terminal free-fall velocity of the particle, the particle is carried away by the gas. For the calculation of the terminal free-fall velocity of the particulate material fed into the multizone circulating reactor, the mean particle diameter of this particulate material has to be used.

In an embodiment of the present disclosure, in step d), the upwards gas velocity in the bottom part of the second reaction zone is lower than the terminal free-fall velocity but higher than the minimum fluidization velocity of the particulate material fed into the multizone circulating reactor. This avoids that, after having started the feeding of the particulate material comprising the polymerization catalyst, the particulate material immediately settles in the second reaction zone, which may result in an uncontrolled polymerization reaction and chunk formation if one or more olefins are present in step d).

In an embodiment of the present disclosure, in step d), the upwards gas velocity in the first reactor zone is higher than the terminal free-fall velocity of the particulate material fed into the multizone circulating reactor. Consequently, the first reactor zone operates as a riser.

As step e), one or more olefins may be fed to the multizone circulating reactor after the feeding of the particulate material in step c) has started and the one or more olefins are then reacting to polyolefin the in the presence of the polymerization catalyst. The start-up process of the present disclosure may however also be carried out without feeding of olefins if the particulate material in step c) comprises polyolefin, for example if the particulate material are growing polyolefin particles produced in an upstream arranged polymerization reactor. In such a case, it is within the scope of the present disclosure to carry out some or all of the subsequent steps f) to h) without feeding olefins to the multizone circulating reactor and only thereafter commencing with feeding one or more olefins so to finally arriving at steady state polymerization conditions.

According to step f) of the process of the present disclosure, one or more olefins or a particulate material comprising a polymerization catalyst and polyolefin or one or more olefins and a particulate material comprising a polymerization catalyst and polyolefin are fed into the multizone circulating reactor while the polymer discharged line is closed, i.e. no polyolefin is discharged from the multizone circulating reactor. Accordingly, the amount of polyolefin within the multizone circulating reactor increases because polyolefin is formed within the multizone circulating reactor and/or because polyolefin is introduced into the multizone circulating reactor. By controlling the gas flow in the second reactor zone according to step d), it is ensured that at least the majority of particles fed into the multizone circulating reactor are not carried away from the second reactor zone in upward direction. Depending on the size of the particles and the flow rate of gas in the second reactor zone, the particles can remain in a fluidized state within the second reactor zone or the particles can leave the second reactor countercurrently to the gas flow through the opening of the throttling valve.

In a embodiment of the present disclosure, the upwards gas velocity in the first reactor zone is controlled in step d) in that the particles within the multizone circulating reactor, or at least a coarser part of the particles within the multizone circulating reactor, are maintained in a fluidized state, i.e. that the first reactor zone operates as a fluidized-bed reactor. Particulate material fed into the first reactor zone or into the second connecting part and particles leaving the second reactor zone will accumulate in the fluidized bed within the first reactor zone until the first reactor zone is completely filled and the fluidized bed starts to flow over to the second reactor. In another embodiment of the present disclosure, the upwards gas velocity in the first reactor zone is higher than the terminal free-fall velocity of the particles within the multizone circulating reactor, i.e. that first reactor zone operates as a riser. The particulate material fed into the first reactor zone or into the second connecting part and particles leaving the second reactor zone are then immediately transported into the second reactor zone. In both embodiments of the present disclosure, the amount of particles within the second reactor zone goes up and accordingly the weight of the particulate polyolefin in the second reactor zone increases and, caused by the higher resistance of the particles within the second reactor zone, the upward velocity of the gas within the second reactor zone decreases. When the weight of the particulate polyolefin in the second reactor zone becomes higher than the drag force of the upward moving gas, the fluidized bed within the second reactor zone collapses and a settled bed of polyolefin particles forms. From that point of time, the upwards gas velocity in the bottom part of the second reaction zone is inevitably lower than the terminal free-fall velocity and lower than the minimum fluidization velocity of the particulate material fed into the multizone circulating reactor.

In a embodiment of the present disclosure, a liquid hydrocarbon which vaporizes under the conditions within the second reactor zone is fed into the second reactor zone, or into the bottom part of the second reactor zone, during step f). The vaporization of the liquid hydrocarbon allows taking away effectively the heat of polymerization generated within the second reactor zone during step f).

The settled bed formed in the end of step f) does not fill the second reactor zone completely. Accordingly, step g) provides that by controlling the feeding rates of the one or more olefins and the particulate material comprising a polymerization catalyst and polyolefin into the multizone circulating reactor and the rate for the optional discharge of the produced polyolefin, a higher amount of the one or more olefins and/or of polyolefin is introduced into the multizone circulating reactor than polyolefin is withdrawn from the reactor. Furthermore, although the settled bed formed in the end of step f) does not fill the second reactor zone completely, the bed nonetheless stands above the throttling valve. This allows controlling the circulation rate of the polymer particles within the multizone circulating reactor by adjusting the opening of the throttling valve and adjusting the flow rate of the dosing gas. Step g) may be carried out without discharging polyolefin from the multizone circulating reactor.

Operating the multizone circulating reactor under the conditions of step g) is continued until the level of the settled bed of polyolefin particles reaches the upper part of the second reactor zone. Thereafter, steady state polymerization is taken up. Consequently, in step h), discharge of polyolefin from the multizone circulating reactor is started or increased and the amount of discharged polyolefin is balanced with the combined amounts of introduced olefin(s) and polyolefin by controlling the feeding rates of the one or more olefins and the particulate material comprising a polymerization catalyst and polyolefin into the multizone circulating reactor and controlling the discharge rate of the produced polyolefin. Furthermore, the circulation rate of the polymer particles within the multizone circulating reactor is controlled by adjusting the opening of the throttling valve and adjusting the flow rate of the dosing gas.

In an embodiment, the present disclosure further provides processes for producing a polyolefin by polymerizing one or more olefins in a multizone circulating reactor, wherein the polymerization reaction has been started by any of the start-up processes of the present disclosure. The processes may be processes for preparing an ethylene polymer by homopolymerizing ethylene or copolymerizing ethylene with one or more comonomers or the processes are processes for preparing a propylene polymer by homopolymerizing propylene or copolymerizing propylene with one or more comonomers.

In a embodiment of the present disclosure, the final steady state polymerization in the multizone circulating reactor is carried out in a way that the reaction gas mixture leaving the first reactor zone is partially or totally prevented from entering the second reactor zone for establishing different polymerization conditions between the first and at least a part of the second reactor zone. This can for example be achieved by feeding a barrier fluid in form of a gas and/or liquid mixture into the second reactor zone, for example in the upper part of the second reactor zone. The barrier fluid may have a composition different from that of the gas mixture present in the first reactor zone. The amount of added barrier fluid can be adjusted in a way that an upward flow of gas countercurrent to the flow of the polymer particles is generated, particularly at the top thereof, acting as a barrier to the gas mixture entrained with the particles coming from the first reactor zone.

The barrier fluid may come from a recycle gas stream and may be obtained by partly condensing the stream. As a consequence, the barrier fluid may contain, besides the monomers to be polymerized, also inert compounds used as a polymerization diluent like nitrogen or alkanes having from 1 to 10 carbon atoms, hydrogen or other components of the reaction gas mixture.

The preparation of the barrier fluid may be accomplished by separating off a part of the recycle gas stream, for example downstream of the compressor and upstream of the heat exchanger comprised in the recycle line, passing the separated gas through a heat-exchanger or a distillation section for partly condensing and separating the resulting liquid-gas mixture in a liquid and a gaseous stream. The barrier fluid may have a composition that the gas produced by vaporizing the barrier fluid has less than 10 vol. % hydrogen or less than 3 vol. % hydrogen. In a embodiment, the barrier fluid has a composition that the gas produced by vaporizing the barrier fluid has less than 0.5 vol. % hydrogen, or less than 0.2 vol. % hydrogen or less than 0.1 vol. % hydrogen. A feed stream comprising ethylene and optionally one or more comonomers may be introduced into the second reactor zone together with the barrier fluid or in close proximity to the feeding point of the barrier fluid.

The barrier fluid may be fed in liquid form into the upper part of the second reactor zone.

EXAMPLES

The melt flow rate $MFR_{190/2.16}$ was determined according to DIN EN ISO 1133-1:2012-03 at a temperature of 190° C. under a load of 2.16 kg.

The melt flow rate $MFR_{190/21.6}$ was determined according to DIN EN ISO 1133-1:2012-03 at a temperature of 190° C. under a load of 21.6 kg.

The density was determined according to DIN EN ISO 1183-1:2004, Method A (Immersion) with compression molded plaques of 2 mm thickness. The compression molded plaques were prepared with a defined thermal history: pressed at 180° C., 20 MPa for 8 min with subsequent crystallization in boiling water for 30 min.

The melt flow rate $MFR_{230/2.16}$ was determined according to DIN EN ISO 1133-1:2012-03 at a temperature of 230° C. under a load of 2.16 kg.

Example 1

The production of a polyethylene in a cascade of a fluidized-bed reactor and a multizone circulating reactor having two interconnected reaction zones as shown in FIG. 2 was started with both reactors being empty; i.e. both reactors did not contain polymer particles.

The fluidized bed reactor (101) had an internal diameter of 500 mm and a height of 4 m and was equipped with a differential pressure gage for determining the weight of the fluidized bed within the reactor. For start-up, the fluidized bed reactor (101) was pressurized with propane to 3.0 MPa and heated up to 80° C. Then ethylene and hydrogen were fed into fluidized bed reactor (101) and a gas composition of 6 vol. % ethylene, 8% vol. % hydrogen, and the remainder being propane was established. The circulation of gas through fluidized bed reactor (102) and recycle line (105) was started and the upwards gas velocity in the cylindrical part of the fluidized bed reactor (101) was set to 0.45 m/s.

The riser (22) had an internal diameter of 200 mm and a length of 19 m. The downcomer (23) had a total length of 18 m, an upper part of 5 m with an internal diameter of 300 mm and a lower part of 13 m with an internal diameter of 150 mm. The downcomer (23) was equipped with a butterfly valve (44) at a height of 0.5 m and both the riser (22) and the downcomer (23) were equipped were with a gamma ray source and gamma ray detectors for measuring the densities of the reaction mixtures within these reactor zones. For start-up, the multizone circulating reactor (21) was pressurized with propane to 2.6 MPa and heated up to 80° C. Then ethylene and hydrogen were fed into multizone circulating reactor (21) and a gas composition of 5 vol. % ethylene, 2.5 vol. % hydrogen, and the remainder being propane was established. The circulation of gas through multizone circulating reactor (21) and recycle line (29) was started and the upwards gas velocity in the riser (22) was set to 1.2 m/s.

9.1 g/h of a Ziegler-Natta catalyst, which had been prepared according to example 1a of WO 2014/202420 A1 with a molar feed ratio of electron donor/Ti of 8, were fed using 5 kg/h of liquid propane to a first stirred precontacting vessel, into which also triisobutylaluminum (TIBA), diethylaluminum chloride (DEAC) and tetrahydrofuran (THF) were dosed. The weight ratio of triisobutylaluminum to diethylaluminum chloride was 7:1. The weight ratio of the aluminum alkyls to the catalyst solid was 5:1. The weight ratio of the aluminum alkyls to THF was 70:1. The first precontacting vessel was kept at 50° C. with a residence time of 30 minutes. The catalyst suspension of the first precontacting vessel was continuously transferred to a second stirred precontacting vessel, which was also operated at 50° C. with a residence time of 30 minutes. The catalyst suspension was then transferred continuously to fluidized-bed reactor (101) via line (110).

Three hours after the catalyst feed to the first precontacting vessel had been started, a bed level in fluidized bed reactor (101) was detected. The feeds of ethylene and hydrogen via line (109) to fluidized-bed reactor (101) were slowly adjusted to obtain an ethylene concentration of 12 vol. % and a hydrogen concentration of 16 vol. %. No comonomer was added. Eight hours after the catalyst feed to the first precontacting vessel had been started, the bed level reached the targeted hold-up of polymer in the fluidized bed reactor of 140 kg. The resulting feed rates for ethylene and hydrogen were 42 kg/h of ethylene and 140 g/h of hydrogen.

After the targeted bed level in the fluidized bed reactor (101) was reached, polymer discharge from fluidized bed reactor (101) was started. The polyethylene particles were discontinuously discharged via line (111) to solid/gas separator (112) and then conveyed via line (114) to multizone circulating reactor (21).

Butterfly valve (44) at the bottom of downcomer (23) was set to an opening of 20% of the maximum opening to limit the circulation rate of the polyethylene particles in multizone circulating reactor (21). The amount of dosing gas fed via line (45) was set to 200 kg/h. Two hours after the polymer discharge from fluidized bed reactor (101) to multizone circulating reactor (21) had been started, the density in riser (22) reached a value of 90 kg/m$^3$. The density in the bottom part of downcomer (23) reached a value of 150 kg/m$^3$. Three hours after the polymer discharge from fluidized bed reactor (101) to multizone circulating reactor (21) had been started, the density in riser (22) reached 110 kg/m$^3$. The density in the bottom part of downcomer (23) reached 430 kg/m$^3$, which corresponds to the density of a moving bed of polyethylene particles.

The ethylene and hydrogen concentrations were slowly adjusted to 10 vol. % ethylene and 1 vol. % hydrogen by increasing the ethylene and hydrogen feeds via line (47).

Six hours after the polymer discharge from fluidized bed reactor (101) to multizone circulating reactor (21) had been started, the level in the downcomer reached the target value of 16.5 m and the discharge of polymer particles from multizone circulating reactor (21) via line (35) was commenced. After 10 hours, the full throughput of the multizone circulating reactor (21) of 90 kg/h was reached. The density in riser (22) reached a stable value of 150 kg/m$^3$. The density in the bottom part of downcomer (23) stayed constant at 430 kg/m$^3$.

The polyethylene obtained in fluidized-bed reactor (101) had an MFR$_{190/2.16}$ of 12 g/10 min and a density of 0.967 g/cm$^3$. The polyethylene discharged from the multizone circulating reactor (21) had an MFR$_{190/21.6}$ of 20 g/10 min and a density of 0.960 g/cm$^3$.

Comparative Example A

The start-up for the production of polyethylene described Example 1 was repeated under identical conditions. However, after the targeted bed level in the fluidized bed reactor (101) was reached, the polymer particles were discharged to the multizone circulating reactor (21) which had butterfly valve (44) at the bottom of downcomer (23) fully opened.

Two hours after the polymer discharge had been started, the density in riser (22) reached a value of 130 kg/m$^3$. The density in the bottom part of downcomer (23) reached a value of 140 kg/m$^3$. Three hours after the polymer discharge from fluidized bed reactor (101) to multizone circulating reactor (21) had been started, the density in riser (22) reached 150 kg/m$^3$. The density in the bottom part of downcomer (23) reached 180 kg/m$^3$. The density readings of both riser (22) and downcomer (23) were fluctuating significantly, which means that the circulation velocity of the polymer powder within multizone circulating reactor (21) was erratic. Five hours after the polymer discharge from fluidized bed reactor (101) to multizone circulating reactor (21) had been started, the multizone circulating reactor (21) had to be shut down. Polymer powder was found in the recycle line (29) in the compressor (30) and in the heat exchanger (31).

Example 2

The production of polypropylene in a multizone circulating reactor having two interconnected reaction zones as shown in FIG. 1 was started with the multizone circulating reactor being empty; i.e. the reactor did not contain polymer particles.

The riser (22) had an internal diameter of 1800 mm and a length of 34 m. The downcomer (23) had a total length of 35 m, an upper part of 7 m with an internal diameter of 2200 mm, a middle part of 5 m with an internal diameter of 1800 mm and a lower part of 21 m with an internal diameter of 1100 mm. The downcomer (23) was equipped with a butterfly valve (44) installed immediately below the lower part of the downcomer and both the riser (22) and the downcomer (23) were equipped were with a gamma ray source and gamma ray detectors for measuring the densities of the reaction mixtures within these reactors. For start-up, the multizone circulating reactor (21) was pressurized with propylene to 2.8 MPa and heated up to 75° C. Then hydrogen was fed into multizone circulating reactor (21) and a gas composition of 0.6 vol. % hydrogen and the remainder being propylene was established. The circulation of gas through multizone circulating reactor (21) and recycle line (29) was started and the upwards gas velocity in the riser (22) was set to 1.7 m/s.

0.4 kg/h of a Ziegler-Natta catalyst, which had been prepared according the Example 5, lines 48 to 55 of EP 0 728 769 B2 with the difference that the starting support had formula MgCl$_2$-1.7EtOH, were fed to a stirred pre-contacting vessel (3), into which triethylaluminum and dicyclopentyldimethoxysilane were dosed. The weight ratio of triethylaluminum to the catalyst solid was 5:1. The weight ratio of triethylaluminum to dicyclopentyldimethoxysilane was 4:1. The precontacting vessel (3) was kept at 15° C. with a residence time of 5 minutes. The catalyst suspension was then transferred continuously to the pre-polymerization reactor (5). The pre-polymerization reactor (5) was operated at a temperature of 25° C. with a residence time of 15 minutes. Liquid propylene was fed continuously to the pre-polymerization reactor (5). Pre-polymerized catalyst particles are fed continuously via line (7) to the bottom part of the riser (22).

Valve (44) at the bottom of downcomer (23) was set to an opening of 100% of the maximum opening. Two hours after the discharge of pre-polymerized catalyst particles from pre-poly reactor (5) had been started, the density in riser (22) reached a value of 90 kg/m$^3$. The density in the bottom part of downcomer (23) reached a value of 200 kg/m$^3$. Two and a half hours after the discharge of pre-polymerized catalyst particles from pre-poly reactor (5) had been started, the density in riser (22) reached 110 kg/m$^3$. The density in the bottom part of downcomer (23) reached 450 kg/m$^3$, which corresponds to the density of a moving bed of polypropylene particles.

Dosing gas was kept at 5 t/h until the density in the bottom part of the downcomer (23) reached 450 kg/m$^3$ and was then rapidly increased to the steady state value of 20 t/h. Simultaneously, the riser gas velocity was increased to the steady state value of 2 m/s in order to reach the riser density at steady state of 240 kg/m$^3$.

The hydrogen concentration was kept at target level by slowly increasing the hydrogen feed via line (43).

Five hours after the discharge of pre-polymerized catalyst particles from pre-poly reactor (5) had been started, the level in the downcomer reached the steady state value and the discharge of polymer particles from multizone circulating reactor (21) via line (35) was commenced. Ten hours after the discharge of pre-polymerized catalyst particles from pre-poly reactor (5) had been started, the full throughput of the multizone circulating reactor (21) of 20 t/h was reached.

The polypropylene obtained had an $MFR_{230/2.16}$ of 15 g/10 min.

While multiple embodiments are disclosed, still other embodiments will become apparent to those skilled in the art from the detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

What is claimed is:

1. A process for starting a gas-phase olefin polymerization reaction comprising producing a first polyolefin by polymerizing one or more olefins in a multizone circulating reactor,
    wherein the multizone circulating reactor comprises:
        a vertical first reactor zone comprising a upper region and a lower region,
        a vertical second reactor zone comprising a upper region and a lower region, and wherein the vertical second reactor zone is equipped with a throttling valve at the bottom, and a line for discharging the polyolefin,
            wherein the upper region of the first reactor zone is connected to the upper region of the second reactor zone by a first connecting part, and
            wherein the lower region of the second reactor zone is connected to the lower region of the first reactor zone by a second connecting part; and
        a gas recycle line, which is equipped with a compressor and a heat exchanger for removing the heat of polymerization, wherein the gas recycle line connects the top of the first reactor zone, the top of the second reactor zone, or the first connecting part with at least
        a riser gas introduction point for feeding a riser gas at the bottom of the first reactor zone,
        a dosing gas introduction point for feeding a dosing gas into the second reactor zone above the throttling valve; and
        optionally, a transport gas introduction point for feeding a transport gas to the second connecting part at the end of the connecting part, which is connected with the lower region of the second reactor zone,
    i) filling the multizone circulating reactor with a reactor gas at a pressure from 0.1 to 20 MPa and a temperature from 20 to 200° C., wherein the multizone circulating reactor contains no polyolefin particles,
    j) conveying the reactor gas from the top of the first reactor zone, the top of the second reactor zone, or the first connecting part through the gas recycle line to the riser gas introduction point, to the dosing gas introduction point, and optionally to the transport gas introduction point;
    k) feeding a polymerization catalyst or a polymerization catalyst and a second polyolefin into the multizone circulating reactor;
    l) controlling the gas flow in the second reactor zone by adjusting the opening of the throttling valve and the flow rates of the gas fed to the riser gas introduction point, to the dosing gas introduction point, and optionally to the transport gas introduction point, wherein an upwards gas velocity in the bottom part of the second reaction zone is lower than the terminal free-fall velocity of the polymerization catalyst or a combination of the polymerization catalyst and the second polyolefin that was fed into the multizone circulating reactor;
    m) optionally feeding one or more olefins to the multizone circulating reactor and reacting the one or more olefins in the presence of the polymerization catalyst to produce the first polyolefin;
    n) feeding, with a closed polyolefin discharged line,
        one or more olefins,
        the polymerization catalyst or the combination of the polymerization catalyst and the second polyolefin, or
        one or more olefins, the polymerization catalyst or the combination of the polymerization catalyst and the second polyolefin,
        into the multizone circulating reactor until the weight of the first polyolefin in the second reactor zone is higher than the drag force of the upward moving gas and a settled bed of first polyolefin forms;
    o) thereafter, controlling the circulation rate of the first polyolefin within the multizone circulating reactor by adjusting the opening of the throttling valve and adjusting the flow rate of the dosing gas, optionally discharging the first polyolefin and controlling the feeding rates of:
        the one or more olefins, and the polymerization catalyst, or the combination of the polymerization catalyst and the second polyolefin,
        into the multizone circulating reactor and the rate for the optional discharge of the first polyolefin wherein the combined amounts of introduced second polyolefin and olefin(s) are higher than the amount of discharged first polyolefin until the level of the settled bed of first polyolefin reaches the upper part of the second reactor zone;
    p) thereafter, controlling the circulation rate of the first polyolefin within the multizone circulating reactor by adjusting the opening of the throttling valve and adjusting the flow rate of the dosing gas, discharging the first polyolefin and controlling the feeding rates of the one or more olefins, the polymerization catalyst, and the second polyolefin into the multizone circulating reactor and the discharge rate of the first polyolefin wherein the combined amounts of introduced second polyolefin and olefin(s) are balanced with the amount of discharged first polyolefin.

2. The process of claim 1, wherein the first reactor zone is a riser, in which growing first polyolefin particles flow upwards under fast fluidization or transport conditions.

3. The process of claim 2, wherein in step l) the upwards gas velocity in the first reactor zone is higher than the terminal free-fall velocity of the polymerization catalyst or the combination of the polymerization catalyst and second polyolefin that was fed into the multizone circulating reactor.

4. The process of claim 1, wherein the first reactor zone is a reactor zone, in which the polymerization occurs in a fluidized bed of growing first polyolefin particles.

5. The process of claim 1, wherein in step n), a liquid hydrocarbon which vaporizes under the conditions within the second reactor zone is fed into the second reactor zone.

6. The process of claim 1, wherein the polymerization catalyst or the combination of the polymerization catalyst and second polyolefin is fed into the lower part of the first reactor zone or into the second connecting part.

7. The process of claim 1, wherein the throttling valve is a butterfly valve.

8. The process of claim 1, wherein the reactor gas comprises one or more alkanes having from 1 to 10 carbon atoms and the amount of alkanes having from 1 to 10 carbon atoms in the reactor gas is from 30 to 99 vol. %.

9. The process of claim 1, wherein the polymerization catalyst is a pre-polymerized polymerization catalyst.

10. The process of claim 1 wherein the multizone circulating reactor is part of a reactor cascade.

11. The process of claim 9, wherein the pre-polymerized polymerization catalyst is produced in a polymerization reactor arranged upstream of the multizone circulating reactor, or wherein the combination of the polymerization catalyst and the second polyolefin is produced in a polymerization reactor arrange upstream of the multizone circulating reactor.

12. The process of claim 11, wherein the polymerization reactor arranged upstream of the multizone circulating reactor is a fluidized bed reactor.

13. The process of claim 1, wherein the first polyolefin is an ethylene polymer prepared by homopolymerizing ethylene or copolymerizing ethylene with one or more comonomers.

14. The process of claim 1, wherein the first polyolefin is a propylene polymer prepared by homopolymerizing propylene or copolymerizing propylene with one or more comonomers.

15. A process for producing a first polyolefin by polymerizing one or more olefins in a multizone circulating reactor, wherein the polymerization reaction has been started by the process of claim 1.

* * * * *

UNITED STATES PATENT AND TRADEMARK OFFICE
CERTIFICATE OF CORRECTION

PATENT NO. : 10,471,407 B2
APPLICATION NO. : 15/853072
DATED : November 12, 2019
INVENTOR(S) : Mei et al.

It is certified that error appears in the above-identified patent and that said Letters Patent is hereby corrected as shown below:

In the Specification

In Column 2, Line 8, delete "raise" and insert -- rise --, therefor
In Column 2, Line 44, delete "an" and insert -- a --, therefor
In Column 3, Line 40, after "reactor" insert -- . --
In Column 15, Line 31, after "polyolefin" delete "the"

In the Claims

In Column 21, Claim 1, Line 40, after "recycle line," delete "which"
In Column 23, Claim 10, Line 13, after "claim 1" insert -- , --

Signed and Sealed this
Twelfth Day of July, 2022

Katherine Kelly Vidal
*Director of the United States Patent and Trademark Office*